(12) United States Patent
Banipal et al.

(10) Patent No.: US 12,169,785 B2
(45) Date of Patent: Dec. 17, 2024

(54) COGNITIVE RECOMMENDATION OF COMPUTING ENVIRONMENT ATTRIBUTES

(71) Applicant: International Business Machines Corporation, Armonk, NY (US)

(72) Inventors: Indervir Singh Banipal, Austin, TX (US); Shikhar Kwatra, San Jose, CA (US); Nadiya Kochura, Bolton, MA (US); Sourav Mazumder, Contra Costa, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 896 days.

(21) Appl. No.: 17/231,639

(22) Filed: Apr. 15, 2021

(65) Prior Publication Data

US 2022/0335302 A1 Oct. 20, 2022

(51) Int. Cl.
*G06N 3/088* (2023.01)
*G06N 3/044* (2023.01)
(Continued)

(52) U.S. Cl.
CPC .............. *G06N 3/088* (2013.01); *G06N 3/044* (2023.01); *G06N 3/045* (2023.01); *G06N 5/01* (2023.01)

(58) Field of Classification Search
CPC ............ G06N 3/088; G06N 3/08; G06N 3/02; G06N 3/045; G06N 3/044; G06N 3/04; G06N 5/01; G06N 5/00
(Continued)

(56) References Cited

U.S. PATENT DOCUMENTS 8,676,848 B2   3/2014  Balani et al.
9,838,370 B2  12/2017  Doering et al.
(Continued)

FOREIGN PATENT DOCUMENTS

CN   105376244 A   3/2016
CN   110750312 A   2/2020
(Continued)

OTHER PUBLICATIONS

Borkowski et al., Predicting Cloud Resource Utilization, 2016 IEEE/ACM 9th International Conference on Utility and Cloud Computing, Dec. 6-9, 2016.

*Primary Examiner* — Hwei-Min Lu
(74) *Attorney, Agent, or Firm* — Garg Law Firm, PLLC; Rakesh Garg; Nicholas Welling

(57) ABSTRACT

An embodiment includes parsing an input dataset associated with a first node of a decision tree, where the input dataset includes a set of profile values for a set of projected usage parameters for a computing environment. The embodiment identifies a structure of the dataset using a recursive neural network that predicts a question sequence in a hierarchical tree format. The embodiment calculates a first deviation from the predicted question sequence and determines whether the deviation exceeds a threshold value. The embodiment generates a modified input dataset using a disambiguation rule and calculates a second deviation of the modified structure from the predicted question sequence and determines whether the deviation exceeds the threshold value. The embodiment assembles a customized hierarchical path using a generative model and assembles the customized hierarchical path by performing iterations of generating a series of candidate questions until a leaf node is reached.

20 Claims, 7 Drawing Sheets

(51) Int. Cl.
*G06N 3/045* (2023.01)
*G06N 5/01* (2023.01)

(58) Field of Classification Search
USPC .............................................. 706/21, 16, 15
See application file for complete search history.

(56) References Cited

U.S. PATENT DOCUMENTS

| | | | |
|---|---|---|---|
| 10,264,059 | B2 | 4/2019 | Chawla et al. |
| 2009/0083141 | A1 | 3/2009 | Craine |
| 2009/0280456 | A1 | 11/2009 | Ishaq et al. |
| 2011/0125734 | A1 | 5/2011 | Duboue et al. |
| 2011/0257961 | A1 | 10/2011 | Tinkler et al. |
| 2012/0233315 | A1 | 9/2012 | Hoffman et al. |
| 2014/0304257 | A1 | 10/2014 | Ben Shahar et al. |
| 2017/0140322 | A1* | 5/2017 | Kozloski ................ G06N 20/00 |
| 2017/0317949 | A1* | 11/2017 | Aharonov ............. G06F 9/5044 |
| 2017/0345014 | A1 | 11/2017 | Kochura et al. |
| 2018/0012231 | A1* | 1/2018 | Sapoznik ............ G06F 16/3329 |
| 2019/0171438 | A1* | 6/2019 | Franchitti ................ G06N 3/08 |
| 2020/0019642 | A1* | 1/2020 | Dua ..................... G06F 16/3329 |
| 2020/0119988 | A1* | 4/2020 | Castellanos ......... H04L 41/5054 |
| 2020/0226475 | A1* | 7/2020 | Ma .......................... G06F 40/30 |
| 2020/0265195 | A1* | 8/2020 | Galitsky ................ G06F 40/253 |
| 2020/0314171 | A1* | 10/2020 | Featonby ............ G06F 9/45558 |
| 2020/0410001 | A1* | 12/2020 | Sarkissian ............. G06F 3/0482 |
| 2021/0034420 | A1* | 2/2021 | Koch ..................... G06Q 10/06 |
| 2021/0035186 | A1* | 2/2021 | Koch ..................... G06F 17/18 |

FOREIGN PATENT DOCUMENTS

| | | |
|---|---|---|
| CN | 110750359 A | 2/2020 |
| CN | 111444026 A | 7/2020 |
| WO | 2012125144 A1 | 9/2012 |

* cited by examiner

COGNITIVE RECOMMENDATION OF COMPUTING ENVIRONMENT ATTRIBUTES

BACKGROUND

The present invention relates generally to a method, system, and computer program product for cognitive processing. More particularly, the present invention relates to a method, system, and computer program product for cognitive recommendation of computing environment attributes.

Artificial intelligence (AI) technology has evolved significantly over the past several years and has given way to a new class of devices referred to as AI virtual assistants. AI virtual assistants are able to understand and respond to voice commands due in part to advances in various types of AI technologies.

For example, an Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

Recurrent neural networks (RNNs), and their sub-type neural networks known as long short-term memory (LSTM) networks, are a type of artificial neural network designed to recognize patterns in sequences of data. RNNs and LSTMs are different from other neural networks in that they take time and sequence into account. RNNs and LSTMs take as their input not just the current input example they see, but also what they have perceived previously in time. RNNs and LSTMs have two sources of input: the present and the recent past. These two sources combine to determine how the RNN/LSTM responds to new data. Thus, the decision that an RNN or LSTM reaches at time step t-1 affects the decision it will later reach at time step t.

SUMMARY

The illustrative embodiments provide for cognitive recommendation of computing environment attributes. An embodiment includes parsing an input dataset associated with a first node of a decision tree, wherein the input dataset includes a set of profile values for a set of projected usage parameters for a computing environment. The embodiment also includes identifying a structure of the dataset using a recursive neural network (RNN), wherein the RNN predicts a question sequence in a hierarchical tree format based on the input dataset. The embodiment also includes wherein the question sequence includes a set of questions for gathering additional usage details for making an asset recommendation for the computing environment. The embodiment also includes calculating a first deviation of the structure from the predicted question sequence, wherein the first deviation is based on a confidence value generated by the RNN in association with the predicted question sequence. The embodiment also includes determining that the first deviation exceeds a threshold value. The embodiment also includes generating a modified input dataset from the input dataset using a disambiguation rule. The embodiment also includes calculating a second deviation of a modified structure associated with the modified input dataset from the predicted question sequence. The embodiment also includes determining that the second deviation exceeds the threshold value. The embodiment also includes assembling a customized hierarchical path using a generative model on the input dataset. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
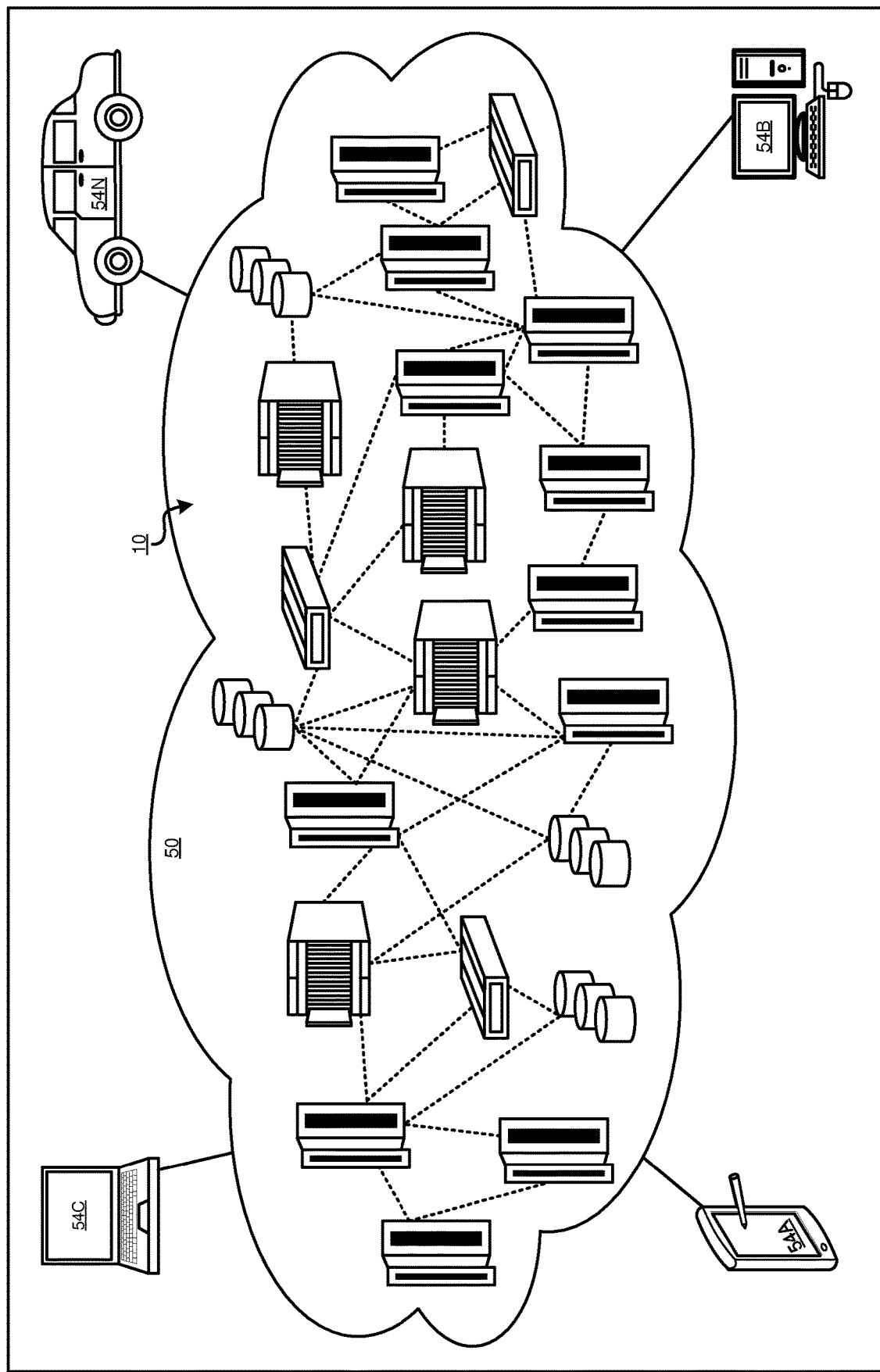
FIG. 1 depicts a cloud computing environment according to an embodiment of the present invention.

Cloud computing is a model for enabling convenient, on-demand network access to a shared pool of configurable computing assets (e.g., networks, servers, storage, applications, and services). However, estimating the configuration of assets needed to support a cloud application is difficult. For example, a complex platform, such as an integration platform, offers a large variety of hardware and software configuration options. It can be difficult for users to determine the optimal configuration based on usage requirements, sometimes resulting in undersized or oversized platforms.

The illustrated embodiments address these issues by providing for cognitive recommendation of computing environment attributes. In an exemplary embodiment, a cognitive recommendation system assists users while setting up a new account, or modifying an existing account, with an Internet-based computing service, such as an integration platform or other cloud computing service that provides access to a shared pool of configurable computing resources (e.g., networks, servers, storage, applications, and services).

For example, in some embodiments, the cognitive recommendation system assists with determining an optimal asset configuration for the computing resources, which may include one or more types of hardware, hardware attributes, and one or more software resources.

In some embodiments, the cognitive recommendation system assembles a database of a plurality of training datasets representative of asset characteristics of previously configured computing environments. In some embodiments, the cognitive recommendation system assembles the database in at least one memory. For example, in some embodiments, the cognitive recommendation system collects data from past installations and operations. In some such embodiments the collected data includes one or more types of information, such as:
 (a) Metadata about past installations and operations;
 (b) Information regarding customer domains and types of business;
 (c) Information about the customer accounts (e.g., premium or standard account);
 (d) Information, such as asset characteristics, about past product or system installations;
 (e) Information about past expected hardware and/or software requirements compared to actual usages; and/or
 (f) Information about the number and size of persistent volumes requested in the past with respect to information types (a)-(e).

In some embodiments, the cognitive recommendation system includes an opt-in and opt-in management system to allow customers to voluntarily opt-in to allowing collection of the information, such as information types (a)-(e) above.

In some embodiments, a cognitive recommendation system assembles a database to include a plurality of data categories. The exact categories may vary and will be largely implementation specific. As non-limiting examples, the categories in an embodiment include domain of the customer, scalability requirements of the customer, and/or plan size/scalability/contract types of the customer. In some such embodiments, the cognitive recommendation system maps each of the plurality of datasets to at least one of a plurality of such data categories in the database.

In some embodiments, the database includes training data, such as training data that includes training datasets representative of asset characteristics of previously configured computing environments. In some embodiments, the cognitive recommendation system trains the decision tree model based on sequence information stored in the database. For example, in some embodiments, the database includes information regarding changes made in past accounts correlated with demand or usage changes in those accounts. In some such embodiments, the cognitive recommendation system trains the decision tree to include sequences of questions based on the sequences of changes in the training data.

In an exemplary embodiment, the cognitive recommendation system is activated in response to a user action that indicates that the user is setting up a new account or revising an existing account. The cognitive recommendation system presents a question sequence to the user and processes the user's responses to generate a recommendation for an optimal asset configuration for the computing resources, which may include one or more types of hardware, hardware attributes, and one or more software resources.

In some embodiments, the cognitive recommendation system uses the training data to generate an initial set of one or more questions for a first node of a decision tree based on the training data. The cognitive recommendation system presents the initial set of one or more questions to the user via a user device.

In some embodiments, the cognitive recommendation system receives a dataset of the user's responses and uses the dataset of the responses to initiate a next level of a decision tree based on cognitive processing of the responses. In some embodiments, the responses include information related to projected usage parameters for a computing environment.

The cognitive recommendation system uses the trained decision tree to process customer information to generate a recommendation for an optimal asset configuration for the computing resources, which may include one or more types of hardware, hardware attributes, and one or more software resources. In some embodiments, the cognitive recommendation system uses an RNN to identify a structure of the dataset of the user's responses to predict the next sequence of questions. In some embodiments, the RNN also generates a confidence value indicative of a degree of certainty associated with the output of the RNN. For example, in some embodiments, the RNN outputs a probability value that is used as a confidence value.

In some such embodiments, the cognitive recommendation system uses the confidence value as a deviation value. The deviation value is a value that is indicative of a deviation of the structure detected by the RNN from the closest predicted question sequence of the trained decision tree. The cognitive recommendation system compares the deviation value to a predetermined threshold value. If the deviation value exceeds the threshold value, this indicates that the question sequences of the trained decision tree do not closely match the information provided by the user, such as usage information. Therefore, either there is an ambiguity in the user inputs or a custom question sequence is needed.

In order to determine if there is an ambiguity, the cognitive recommendation system tries to disambiguate the information input by the user using rule-based disambiguation. In some embodiments, the rule-based disambiguation is based on context/environment, customer type or domain, type of plan (e.g., premium or standard), and/or the past history of the customer. If an ambiguity is detected and corrected by the cognitive recommendation system, the cognitive recommendation system again uses the RNN to identify a structure of the dataset of the user's responses as revised by the cognitive recommendation system to predict the next sequence of questions.

If the cognitive recommendation system does not result in identifying a question sequence of the trained decision tree, then a custom question sequence is needed. In some embodiments, the cognitive recommendation system creates a custom question sequence using a generative adversarial network (GAN) to determine a custom sequence of questions.

In some embodiments, the GAN performs iterations of generating a series of candidate questions for a next level of the decision tree until a deviation of the candidate question is within the threshold value. The iterations continue until a leaf node is reached. In some embodiments, the iterations of generating the series of candidate questions includes generating the series of questions using a generator of the GAN and calculating the deviation of the candidate question using a discriminator of the GAN.

In some embodiments, the cognitive recommendation system uses the sequence of questions to collect additional projected usage parameters from responses to questions associated with the customized hierarchical path, and adds the additional projected usage parameters to the set of projected usage parameters for the computing environment.

In some embodiments, the cognitive recommendation system presents, via a user device, a recommendation regarding an asset configuration for the computing environment based on the set of projected usage parameters. In some embodiments, the recommendation includes one or more types of hardware, one or more attributes of each type of hardware, and/or one or more software resources.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
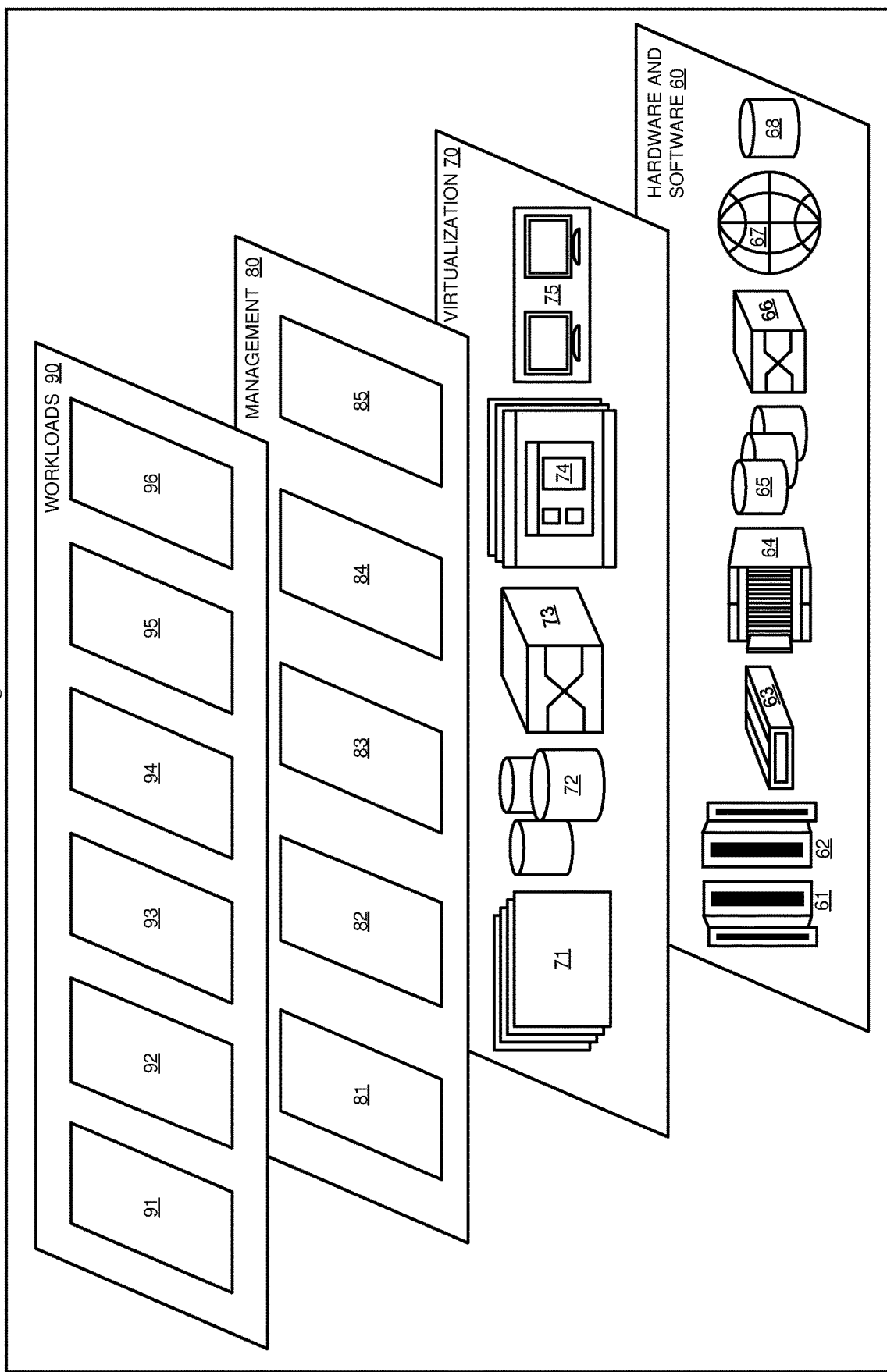
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive recommendation processing 96.

Figure 3:
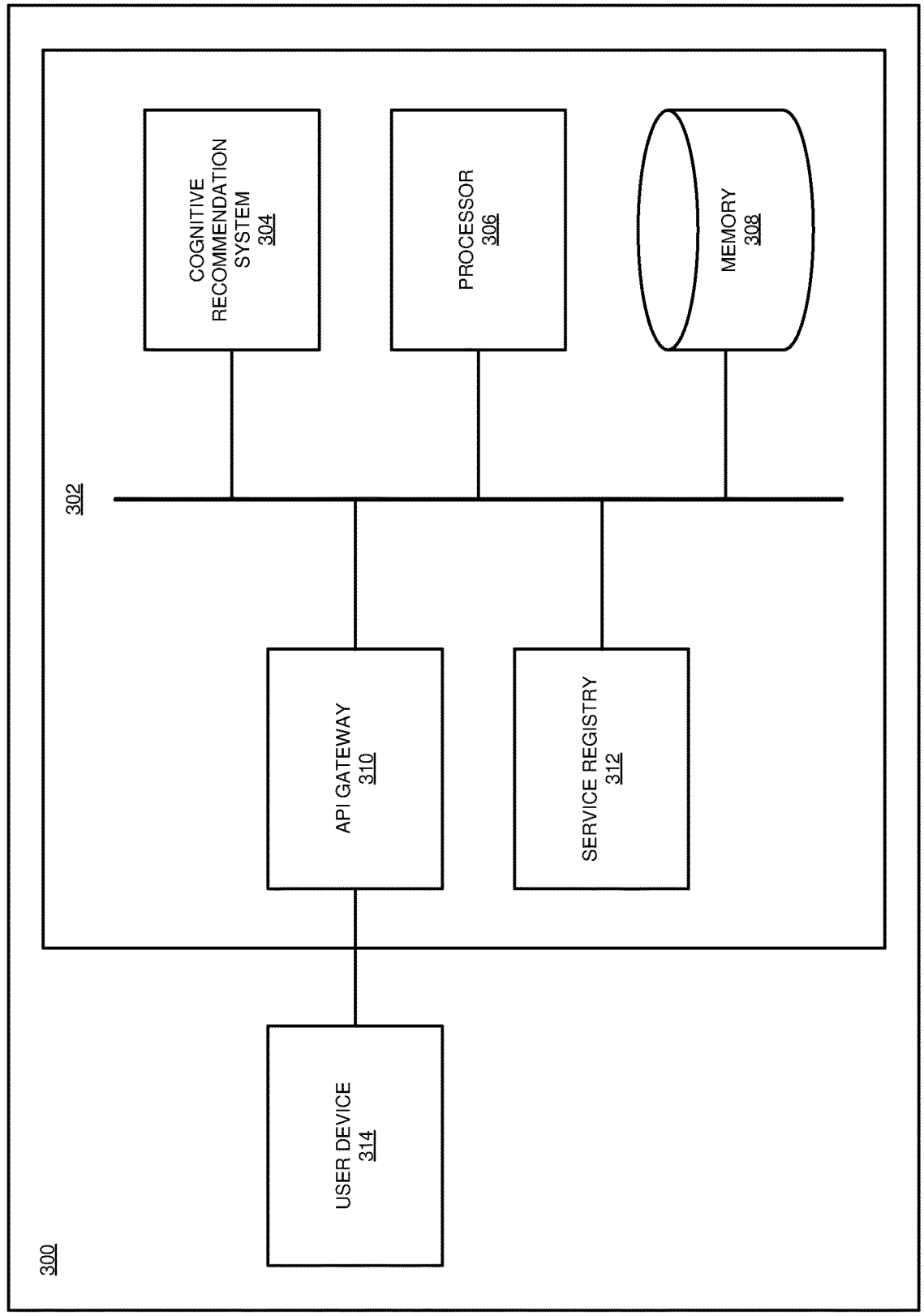
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that provides services and service instances to one or more user devices 314, including cognitive recommendation services from a cognitive recommendation system 304. In some embodiments, the cognitive recommendation system 304 is deployed in workloads layer 90 of FIG. 2. By way of example, in some embodiments, cognitive recommendation system 304 provides cognitive recommendation processing 96 in FIG. 2.

In the illustrated embodiment, the user device 314 communicates with service infrastructure 302 across one or more networks via an API gateway 310. In some embodiments, the service infrastructure 302 uses a distributed microservice architecture. In some such embodiments, the cognitive recommendation system 304 is a microservices-based application that runs as a distributed system across one or more servers. In various embodiments, service infrastructure 302 and its associated cognitive recommendation system 304 serve multiple users and multiple tenants. A tenant is a group of users (e.g., a company) who share a common access with specific privileges to the software instance. Service infrastructure 302 ensures that tenant specific data is isolated from other tenants.

In some embodiments, user device 314 connects with cognitive recommendation system 304 via API gateway 310 and any suitable network or combination of networks such as the Internet, etc. using any suitable communication protocols such as Wi-Fi, Bluetooth, etc. Service infrastructure 302 may be built on the basis of cloud computing. API gateway 310 provides access to client applications like cognitive recommendation system 304. API gateway 310 receives service requests issued by client applications, and creates service lookup requests based on service requests. As a non-limiting example, in an embodiment, the user device 314 executes a routine to initiate a request to the cognitive recommendation system 304 for cognitive recommendation processing.

In the illustrated embodiment, the service infrastructure 302 also includes, or is otherwise associated with, at least one memory 308 that includes at least one computer readable storage medium that stores computer readable program instructions (e.g., computer readable program instructions can include, but are not limited to, the cognitive recommendation system 304 and associated components), and can store any data generated by cognitive recommendation system 304 and associated components. In the illustrated embodiment, the service infrastructure 302 includes, or is otherwise associated with, at least one processor 306 that executes computer readable program instructions stored in memory 308.

In the illustrated embodiment, service infrastructure 302 includes a service registry 312. In some embodiments, service registry 312 looks up service instances of cognitive recommendation system 304 in response to a service lookup request such as one from API gateway 310 in response to a service request from user device 314. For example, in some embodiments, the service registry 312 looks up service instances of cognitive recommendation system 304 in response to requests related to analogy recommendation processing from the user device 314.

In some embodiments, the service infrastructure 302 includes one or more instances of the cognitive recommendation system 304. In some such embodiments, each of the multiple instances of the cognitive recommendation system 304 run independently on multiple computing systems. In some such embodiments, cognitive recommendation system 304, as well as other service instances of cognitive recommendation system 304, are registered in service registry 312.

In some embodiments, service registry 312 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 312 ranks service instances based on their respective performance characteristics and selects top-ranking service instances for service discovery or service lookup requests. In the event that a service instance becomes unresponsive or, unhealthy, the service registry will no longer provide its address or information about this service instance to other services.

Figure 4:
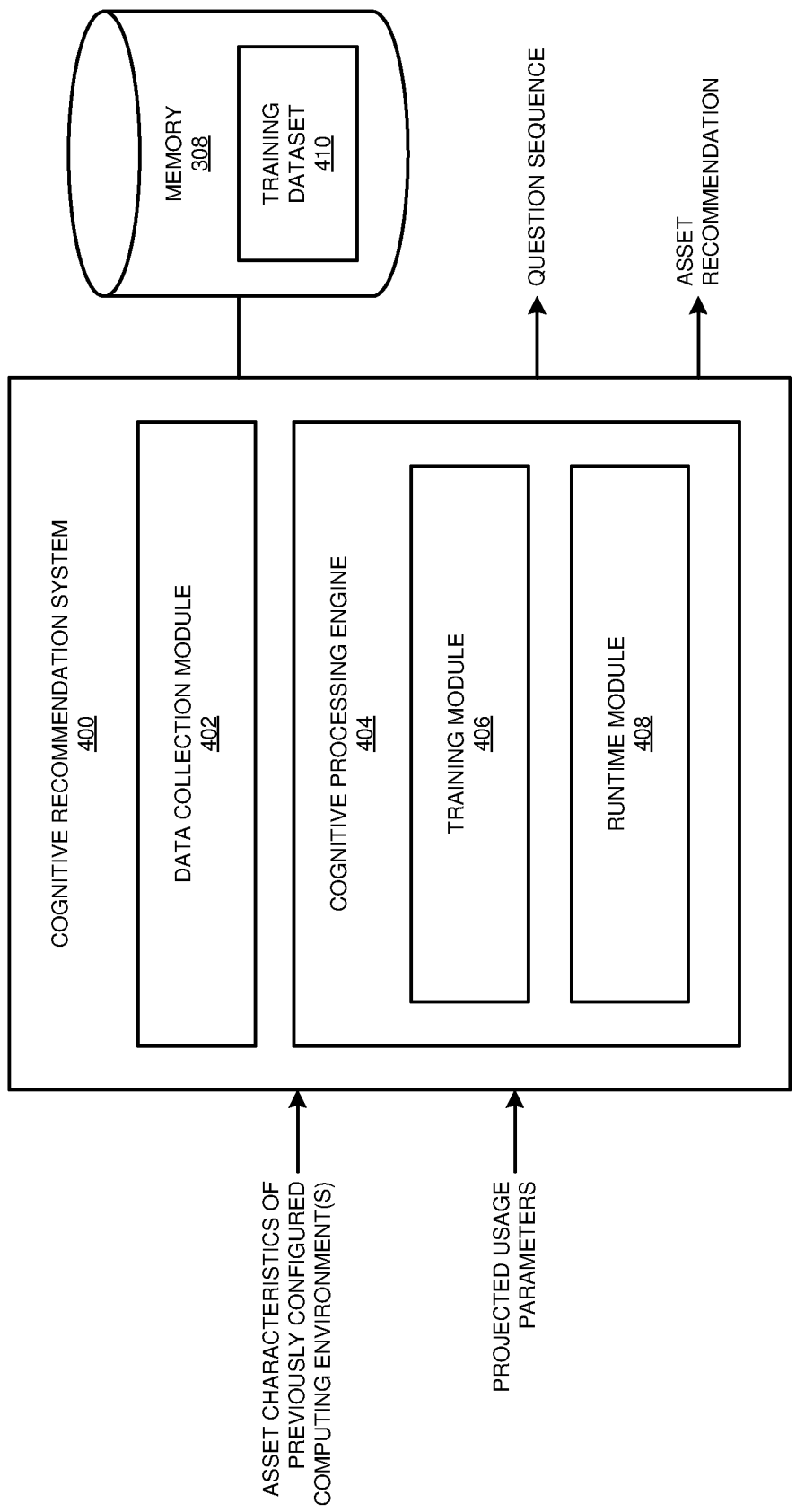
FIG. 4 depicts a block diagram of a cognitive recommendation system in accordance with an illustrative embodiment.

With reference to FIG. 4, this figure depicts a block diagram of a cognitive recommendation system 400 in accordance with an illustrative embodiment. In a particular embodiment, cognitive recommendation system 400 is an example of cognitive recommendation system 304 of FIG. 3.

In some embodiments, the cognitive recommendation system 400 includes a data collection module 402 and a cognitive processing engine 404. The cognitive processing engine 404 incudes a training module 406 and a runtime module 408. In alternative embodiments, the cognitive recommendation system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In an exemplary embodiment, the cognitive recommendation system 400 assists users while setting up a new account, or modifying an existing account, with an Internet-based computing service, such as an integration platform or other cloud computing service that provides access to a shared pool of configurable computing resources (e.g., networks, servers, storage, applications, and services). For example, in some embodiments, the cognitive recommendation system 400 assists with determining an optimal asset configuration for the computing resources, which may include one or more types of hardware, hardware attributes, and one or more software resources.

In some embodiments, the data collection module 402 assembles a database of a plurality of training datasets 410 representative of asset characteristics of previously configured computing environments. In some embodiments, the data collection module 402 assembles the database in least one memory 308. For example, in some embodiments, the data collection module 402 collects data from past installations and operations. In some such embodiments the collected data includes one or more types of information, such as:

(a) Metadata about past installations and operations;
(b) Information regarding customer domains and types of business;
(c) Information about the customer accounts (e.g., premium or standard account);
(d) Information, such as asset characteristics, about past product or system installations;
(e) Information about past expected hardware and/or software requirements compared to actual usages; and/or
(f) Information about the number and size of persistent volumes requested in the past with respect to information types (a)-(e).

In some embodiments, the data collection module 402 includes an opt-in and opt-in management system to allow customers to voluntarily opt-in to allowing collection of the information, such as information types (a)-(e) above.

In some embodiments, data collection module 402 assembles to database to include a plurality of data categories. The exact categories may vary and will be largely implementation specific. As non-limiting examples, the categories in an embodiment include domain of the customer, scalability requirements of the customer, and/or plan size/scalability/contract types of the customer. In some such embodiments, the data collection module 402 maps each of the plurality of datasets to at least one of a plurality of such data categories in the database.

Once data collection module 402 has assembled the database, the training module 406 accesses the database to access the training data. The training module 406 uses the training data to generate an initial set of one or more questions for a first node of a decision tree based on the training data. The training module 406 also trains the decision tree model based on sequence information stored in the database. For example, in some embodiments, the database include information regarding changes made in past accounts correlated with demand or usage changes in those accounts. In some such embodiments, the training module 406 trains the decision tree to include sequences of questions based on the sequences of changes in the training data.

The runtime module 408 uses the trained decision tree to process customer information to generate a recommendation for an optimal asset configuration for the computing resources, which may include one or more types of hardware, hardware attributes, and one or more software resources. For example, in some embodiments, the runtime module 408 collects information from the user using the initial set of one or more questions for the first node of the decision tree. The runtime module 408 then uses the response(s) to the first node question(s) to traverse the decision tree until a leaf node is reached. In some embodiments, if the sequence of questions is straight forward and aligns with the questions trained in the hierarchy portion of the decision tree, then a neural network is used to predict the next sequence of questions. In some embodiments, the neural network is a recursive neural network (RNN) or a Long Short-Term Memory (LSTM) network. If the path of the entire sequence is not aligned with the defined path as trained in the decision tree, the runtime module 408 tries to disambiguate the information input by the user using rule-based disambiguation based on context/environment, customer type or domain, type of plan (e.g., premium or standard), and/or the past history of the customer. In some embodiments, if the runtime module 408 is unable to proceed on the decision tree after attempting disambiguation, then the runtime module 408 follows a generative adversarial network (GAN) based approach to determine a sequence of questions.

Figure 5:
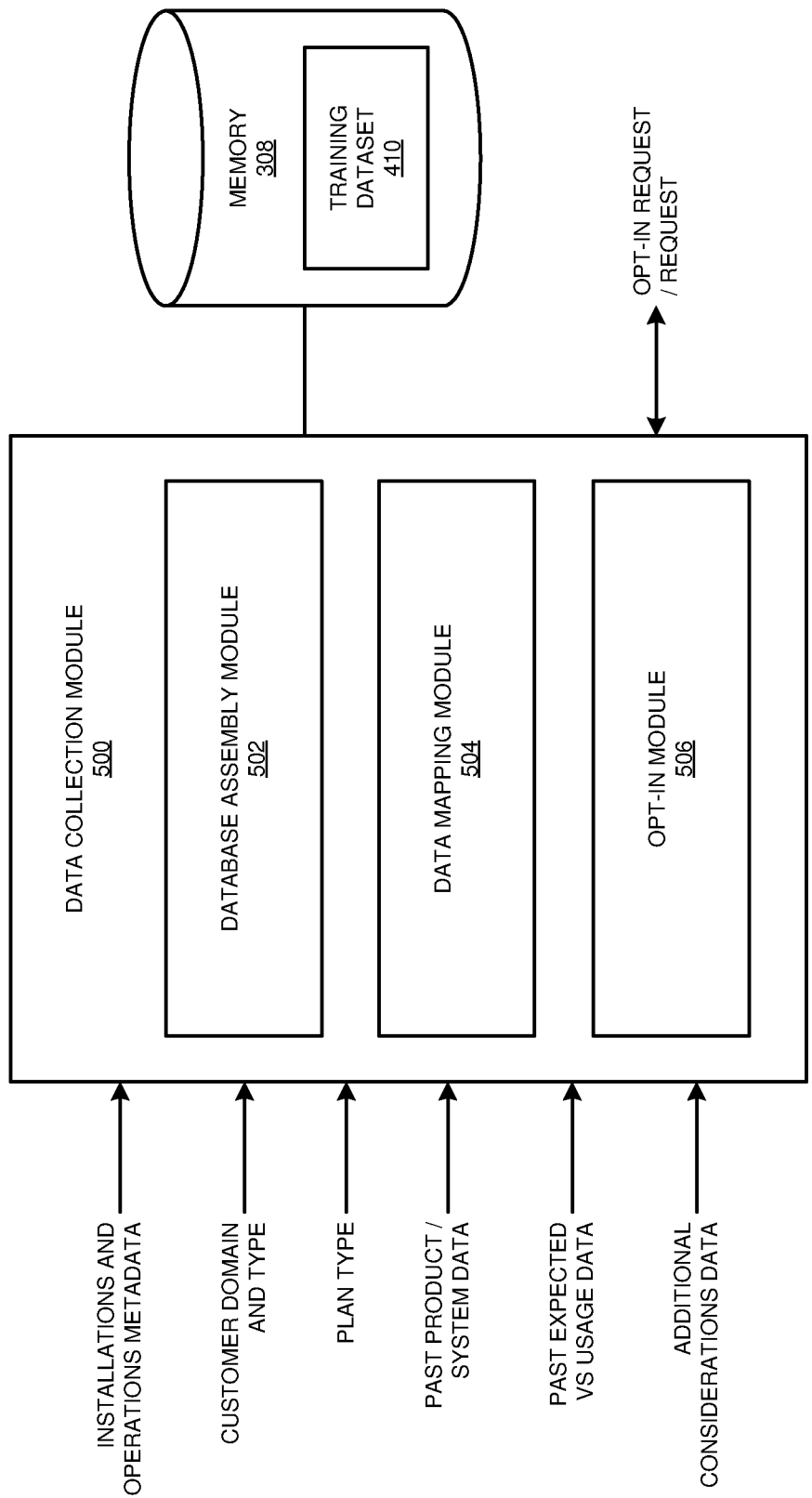
FIG. 5 depicts a block diagram of a data collection module in accordance with an illustrative embodiment.

With reference to FIG. 5, this figure depicts a block diagram of a data collection module 500 in accordance with an illustrative embodiment. In a particular embodiment, data collection module 500 is an example of data collection module 402 of FIG. 4.

In the illustrated embodiment, the data collection module 500 includes a database assembly module 502, a data mapping module 504, and an opt-in module 506. In alternative embodiments, the data collection module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In an exemplary embodiment, the data assembly module 502 assembles a database of a plurality of training datasets 410 representative of asset characteristics of previously configured computing environments. In some embodiments, the database assembly module 502 assembles the database in least one memory 308. For example, in some embodiments, the database assembly module 502 collects data from past installations and operations. In some such embodiments the collected data includes one or more types of information, such as:

(g) Metadata about past installations and operations;
(h) Information regarding customer domains and types of business;
(i) Information about the customer accounts (e.g., premium or standard account);
(j) Information, such as asset characteristics, about past product or system installations;
(k) Information about past expected hardware and/or software requirements compared to actual usages; and/or
(l) Information about the number and size of persistent volumes requested in the past with respect to information types (a)-(e).

In some embodiments, the opt-in module 506 provides opt-in and opt-in management functionality. For example, in some embodiments, the opt-in module 506 allow customers to voluntarily opt-in to allowing collection of the information, such as information types (a)-(e) above. In some embodiments, the opt-in module 506 allows users to manage opt-in choices, such as allowing or disallowing collection of information. In some embodiments, the opt-in module 506 allows users to allow or disallow collection of individual types or categories of information.

In some embodiments, the data mapping module 504 configures the database to include a plurality of data categories. The exact categories may vary and will be largely implementation specific. As non-limiting examples, the categories in an embodiment include domain of the customer, scalability requirements of the customer, and/or plan size/scalability/contract types of the customer. In some such embodiments, the data mapping module 504 maps each of the plurality of datasets to at least one of a plurality of such data categories in the database.

Figure 6:
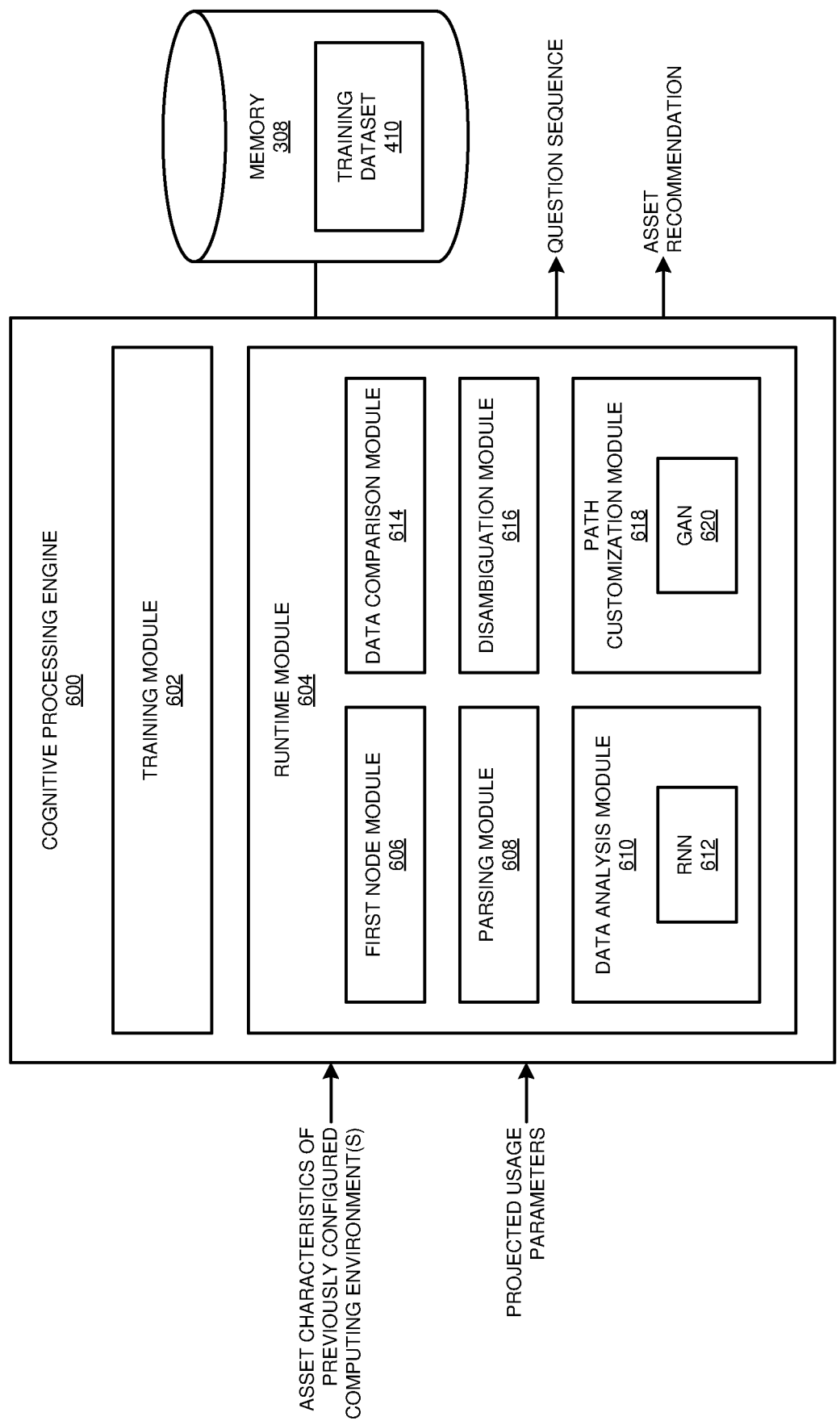
FIG. 6 depicts a block diagram of a cognitive processing engine in accordance with an illustrative embodiment.

With reference to FIG. 6, this figure depicts a block diagram of a cognitive processing engine 600 in accordance with an illustrative embodiment. In a particular embodiment, cognitive processing engine 600 is an example of cognitive processing engine 404 of FIG. 4.

In the illustrated embodiment, the cognitive processing engine 600 includes a training module 602 and a runtime module 604. The runtime module 604 includes a first node module 606, a parsing module 608, a data analysis module 610, a data comparison module 614, a disambiguation module 616, and path customization module 618. In some embodiments the data analysis module 610 includes an RNN 612. In some embodiments, the path customization module 618 includes a GAN 620. In alternative embodiments, the cognitive processing engine 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the training module 602 accesses a database to access training data, such as training data that includes training datasets 410 representative of asset characteristics of previously configured computing environments. In some embodiments, the database includes a database assembled by data collection module 500 of FIG. 5 in the memory 308. In some embodiments, the training module 602 also trains the decision tree model based on sequence information stored in the database. For example, in some embodiments, the database includes information regarding changes made in past accounts correlated with demand or usage changes in those accounts. In some such embodiments, the training module 602 trains the decision tree to include sequences of questions based on the sequences of changes in the training data.

In an exemplary embodiment, the runtime module 604 is activated in response to a user action that indicates that the user is setting up a new account or revising an existing account. The runtime module 604 presents a question sequence to the user and processes the user's responses to generate a recommendation for an optimal asset configuration for the computing resources, which may include one or more types of hardware, hardware attributes, and one or more software resources.

In some embodiments, the first node module 606 uses the training data to generate an initial set of one or more questions for a first node of a decision tree based on the training data. The first node module 606 presents the initial set of one or more questions to the user via a user device, such as user device 314 of FIG. 3. The first node module 606 receives a dataset of the user's responses provides the dataset of responses to the parsing module 608.

The parsing module 608 uses the dataset of the responses to initiate a next level of a decision tree based on cognitive processing of the responses. In some embodiments, the responses include information related to projected usage parameters for a computing environment.

The data analysis module 610 uses the trained decision tree to process customer information to generate a recommendation for an optimal asset configuration for the computing resources, which may include one or more types of hardware, hardware attributes, and one or more software resources. In some embodiments, the data analysis module 610 uses RNN 612 to identify a structure of the dataset of the user's responses to predict the next sequence of questions. In some embodiments, the RNN 612 also generates a confidence value indicative of a degree of certainty associated with the output of the RNN 612. For example, in some embodiments, the RNN 612 outputs a probability value that is used as a confidence value.

In some such embodiments the data comparison module 614 uses the confidence value as a deviation value. The deviation value is a value that is indicative of a deviation of the structure detected by the RNN from the closest predicted question sequence of the trained decision tree. The data comparison module 614 compares the deviation value to a predetermined threshold value. If the deviation value exceeds the threshold value, this indicates that the question sequences of the trained decision tree do not closely match the information provided by the user, such as usage information. Therefore, either there is an ambiguity in the user inputs, or a custom question sequence is needed.

In order to determine if there is an ambiguity, the disambiguation module 616 tries to disambiguate the information input by the user using rule-based disambiguation. In some embodiments, the rule-based disambiguation is based on context/environment, customer type or domain, type of plan (e.g., premium or standard), and/or the past history of the customer. If an ambiguity is detected and corrected by the disambiguation module 616, the data analysis module 610 again uses RNN 612 to identify a structure of the dataset of the user's responses as revised by the disambiguation module 616 to predict the next sequence of questions.

If the disambiguation module 616 does not result in identifying a question sequence of the trained decision tree, then a custom question sequence is needed. In some embodiments, the runtime module 408 creates a custom question sequence using a generative adversarial network (GAN) 620 to determine a custom sequence of questions.

In some embodiments, the GAN 620 performs iterations of generating a series of candidate questions for a next level of the decision tree until a deviation of the candidate question is within the threshold value. The iterations continue until a leaf node is reached. In some embodiments, the iterations of generating the series of candidate questions includes generating the series of questions using a generator of a generative adversarial network (GAN), and calculating the deviation of the candidate question using a discriminator of the GAN.

In some embodiments, the runtime module 604 uses the sequence of questions to collect additional projected usage parameters from responses to questions associated with the customized hierarchical path, and adds the additional projected usage parameters to the set of projected usage parameters for the computing environment.

In some embodiments, the runtime module 604 presents, via a user device such as user device 314 of FIG. 3, a recommendation regarding an asset configuration for the computing environment based on the set of projected usage parameters. In some embodiments, the recommendation includes one or more types of hardware, one or more attributes of each type of hardware, and/or one or more software resources.

Figure 7:
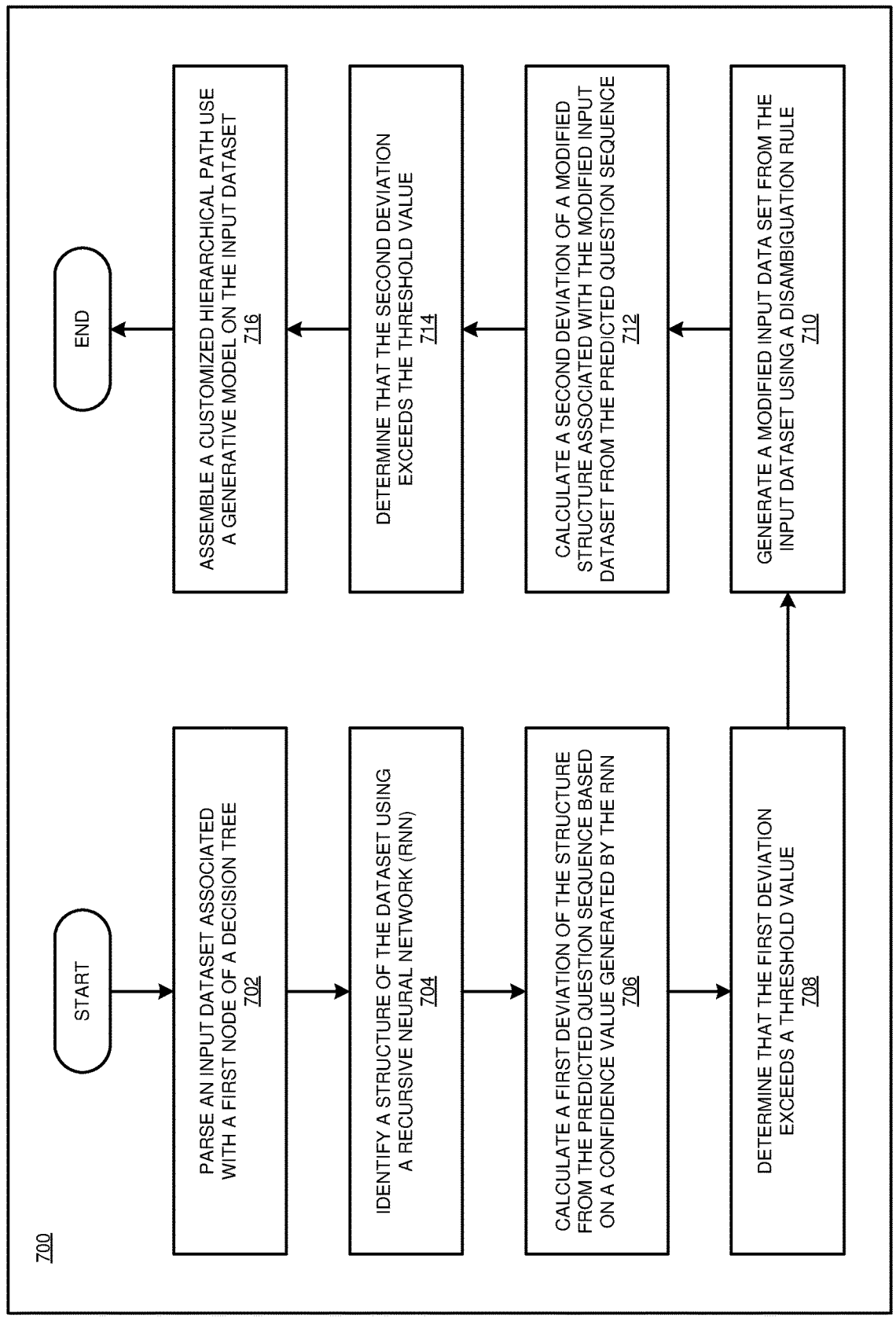
FIG. 7 depicts a flowchart of an example process for cognitive recommendation of computing environment attributes in accordance with an illustrative embodiment.

With reference to FIG. 7, this figure depicts a flowchart of an example process 700 for cognitive recommendation of computing environment attributes in accordance with an illustrative embodiment. In a particular embodiment, the cognitive recommendation system 304 carries out the process 700.

In an embodiment, at block 702, the process parses an input dataset associated with a first node of a decision tree. In some embodiments, the input dataset includes a set of profile values for a set of projected usage parameters for a computing environment. Next, at block 704, the process identifies a structure of the dataset using an RNN. In some embodiments, the RNN predicts a question sequence in a hierarchical tree format based on the input dataset. In some embodiments, the question sequence includes a set of questions for gathering additional usage details for making an asset recommendation for the computing environment.

Next, at block 706, the process calculates a first deviation of the structure from the predicted question sequence. In some embodiments, the first deviation is based on a confidence value generated by the RNN in association with the predicted question sequence.

Next, at block 708, the process determines whether the first deviation exceeds a threshold value. Next, at block 710, if the first deviation exceeds a threshold value, the process generates a modified input dataset from the input dataset using a disambiguation rule. Next, at block 712, the process calculates another deviation of a modified structure associated with the modified input dataset from the predicted question sequence. Next, at block 714, the process determines whether the second deviation exceeds the threshold value. Next, at block 716, if the deviation at block 714 exceeds a threshold value, the process assembles a customized hierarchical path using a generative model on the input dataset.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   generating, using a training dataset, a decision tree, wherein each node of the decision tree represents a question sequence, wherein each question sequence comprises a plurality of questions intended to elicit a response usable in recommending a first configuration of a plurality of computing resources, wherein the training dataset comprises a plurality of asset characteristics of assets within previously configured computing environments;
   receiving a user response to a first question sequence, wherein the first question sequence is represented by a first node of the decision tree;
   generating, by inputting the user response to a recursive neural network (RNN), a second question sequence and a first deviation value, the first deviation value indicative of a deviation between the second question sequence and a plurality of decision tree question sequences, each decision tree question sequence in the plurality of decision tree question sequences represented by a next node in the decision tree, each next node in the decision tree connected by an edge to the first node;
   disambiguating, using a disambiguation rule, the user response, the disambiguating performed responsive to determining that the first deviation value exceeds a threshold, the disambiguating resulting in a disambiguated user response;
   generating, by inputting the user response to the RNN, a third question sequence and a second deviation value, the second deviation value indicative of a deviation between the third question sequence and the plurality of decision tree question sequences;
generating, using a generator portion of a generative associative network (GAN), a custom question sequence;
generating, using a user response to the custom question sequence, a projected usage parameter; and
generating, using the projected usage parameter, the first configuration of the plurality of computing resources.

2. The computer-implemented method of claim 1, wherein the training dataset further comprises a plurality of sequences of past asset changes made in the previously configured computing environments, each past asset change correlated with a demand change or a usage change in the previously configured computing environments.

3. The computer-implemented method of claim 1, further comprising:
iterating generating, using the generator portion of the GAN, the custom question sequence, the iterating continuing until a second deviation value generated by a discriminator portion of the GAN is less than the threshold.

4. The computer-implemented method of claim 1, wherein the first configuration of the plurality of computing resources is provided by an integration platform.

5. The computer-implemented method of claim 1, wherein the RNN is a Long Short-Term Memory (LSTM) network.

6. The computer-implemented method of claim 1, wherein the first configuration of the plurality of computing resources comprises a type of hardware resource and an attribute of the hardware resource.

7. The computer-implemented method of claim 1, wherein the first configuration of the plurality of computing resources comprises a software resource.

8. A computer program product comprising one or more computer readable storage media, and program instructions collectively stored on the one or more computer readable storage media, the program instructions executable by a processor to cause the processor to perform operations comprising:
generating, using a training dataset, a decision tree, wherein each node of the decision tree represents a question sequence, wherein each question sequence comprises a plurality of questions intended to elicit a response usable in recommending a first configuration of a plurality of computing resources, wherein the training dataset comprises a plurality of asset characteristics of assets within previously configured computing environments;
receiving a user response to a first question sequence, wherein the first question sequence is represented by a first node of the decision tree;
generating, by inputting the user response to a recursive neural network (RNN), a second question sequence and a first deviation value, the first deviation value indicative of a deviation between the second question sequence and a plurality of decision tree question sequences, each decision tree question sequence in the plurality of decision tree question sequences represented by a next node in the decision tree, each next node in the decision tree connected by an edge to the first node;
disambiguating, using a disambiguation rule, the user response, the disambiguating performed responsive to determining that the first deviation value exceeds a threshold, the disambiguating resulting in a disambiguated user response;
generating, by inputting the user response to the RNN, a third question sequence and a second deviation value, the second deviation value indicative of a deviation between the third question sequence and the plurality of decision tree question sequences;
generating, using a generator portion of a generative associative network (GAN), a custom question sequence;
generating, using a user response to the custom question sequence, a projected usage parameter; and
generating, using the projected usage parameter, the first configuration of the plurality of computing resources.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of program instructions associated with the request; and
program instructions to generate an invoice based on the metered use.

11. The computer program product of claim 8, wherein the training dataset further comprises a plurality of sequences of past asset changes made in the previously configured computing environments, each past asset change correlated with a demand change or a usage change in the previously configured computing environments.

12. The computer program product of claim 8, further comprising:
iterating generating, using the generator portion of the GAN, the custom question sequence, the iterating continuing until a second deviation value generated by a discriminator portion of the GAN is less than the threshold.

13. The computer program product of claim 8, wherein the first configuration of the plurality of computing resources is provided by an integration platform.

14. The computer program product of claim 8, wherein the RNN is a Long Short-Term Memory (LSTM) network.

15. The computer program product of claim 8, wherein the first configuration of the plurality of computing resources comprises a type of hardware resource and an attribute of the hardware resource.

16. The computer program product of claim 8, wherein the first configuration of the plurality of computing resources comprises a software resource.

17. A computer system comprising a processor and one or more computer readable storage media, and program instructions collectively stored on the one or more computer readable storage media, the program instructions executable by the processor to cause the processor to perform operations comprising:
generating, using a training dataset, a decision tree, wherein each node of the decision tree represents a question sequence, wherein each question sequence comprises a plurality of questions intended to elicit a response usable in recommending a first configuration of a plurality of computing resources, wherein the training dataset comprises a plurality of asset characteristics of assets within previously configured computing environments;

receiving a user response to a first question sequence, wherein the first question sequence is represented by a first node of the decision tree;

generating, by inputting the user response to a recursive neural network (RNN), a second question sequence and a first deviation value, the first deviation value indicative of a deviation between the second question sequence and a plurality of decision tree question sequences, each decision tree question sequence in the plurality of decision tree question sequences represented by a next node in the decision tree, each next node in the decision tree connected by an edge to the first node;

disambiguating, using a disambiguation rule, the user response, the disambiguating performed responsive to determining that the first deviation value exceeds a threshold, the disambiguating resulting in a disambiguated user response;

generating, by inputting the user response to the RNN, a third question sequence and a second deviation value, the second deviation value indicative of a deviation between the third question sequence and the plurality of decision tree question sequences;

generating, using a generator portion of a generative associative network (GAN), a custom question sequence;

generating, using a user response to the custom question sequence, a projected usage parameter; and generating, using the projected usage parameter, the first configuration of the plurality of computing resources.

18. The computer system of claim 17, wherein the training dataset further comprises a plurality of sequences of past asset changes made in the previously configured computing environments, each past asset change correlated with a demand change or a usage change in the previously configured computing environments.

19. The computer system of claim 17, further comprising:

iterating generating, using the generator portion of the GAN, the custom question sequence, the iterating continuing until a second deviation value generated by a discriminator portion of the GAN is less than the threshold.

20. The computer system of claim 17, wherein the first configuration of the plurality of computing resources is provided by an integration platform.

\* \* \* \* \*